US010275535B1

(12) United States Patent
Trauth

(10) Patent No.: US 10,275,535 B1
(45) Date of Patent: Apr. 30, 2019

(54) OBTAINING USER FEEDBACK FROM SOCIAL MEDIA DATA

(71) Applicant: United Services Automobile Association (USAA), San Antonio, TX (US)

(72) Inventor: Kurt Trauth, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 226 days.

(21) Appl. No.: 15/169,179

(22) Filed: May 31, 2016

Related U.S. Application Data

(60) Provisional application No. 62/170,903, filed on Jun. 4, 2015.

(51) Int. Cl.
*G06F 17/30* (2006.01)
(52) U.S. Cl.
CPC .. *G06F 17/30867* (2013.01); *G06F 17/30371* (2013.01); *G06F 17/30489* (2013.01)
(58) Field of Classification Search
None
See application file for complete search history.

(56) References Cited

U.S. PATENT DOCUMENTS

| 9,220,985 B1* | 12/2015 | Auterio | A63F 13/00 |
| 2012/0166292 A1* | 6/2012 | Bax | G06Q 30/0241 |
| | | | 705/14.71 |
| 2013/0006709 A1* | 1/2013 | Kosta | G07F 17/3206 |
| | | | 705/7.29 |
| 2013/0218885 A1* | 8/2013 | Satyanarayanan | G06Q 30/016 |
| | | | 707/728 |
| 2014/0149503 A1* | 5/2014 | Bosworth | G06Q 30/0255 |
| | | | 709/204 |
| 2016/0092793 A1* | 3/2016 | Garrow | G06F 17/3053 |
| | | | 706/12 |
| 2016/0196589 A1* | 7/2016 | Subbarayan | G06Q 30/0279 |
| | | | 705/319 |
| 2017/0243303 A1* | 8/2017 | Doddmani Manjunath | |
| | | | G06Q 50/01 |

OTHER PUBLICATIONS

Cameron et al., "A Hybrid Approach to Finding Relevant Social Media Content for Complex Domain Specific Information Needs," 2014, Elsevier B.V., Web Semantics: Science, Services and Agents on the World Wide Web 29, pp. 39-52.*

* cited by examiner

*Primary Examiner* — Richard L Bowen
(74) *Attorney, Agent, or Firm* — Fish & Richardson P.C.

(57) ABSTRACT

Obtaining user feedback from a social networking service can include obtaining multiple social media posts provided on at least one social networking service, the multiple social media posts being associated with an entity, applying a pronoun filter to the multiple social media posts to obtain a filtered set of social media posts, each social media post in the filtered set including at least one pronoun from a pronoun list, and analyzing the filtered set of social media posts to identify trends or sentiments related to the entity.

29 Claims, 4 Drawing Sheets

OBTAINING USER FEEDBACK FROM SOCIAL MEDIA DATA

CROSS-REFERENCE TO RELATED APPLICATIONS

This application claims priority to U.S. Provisional Application Ser. No. 62/170,903, filed on Jun. 4, 2015, which is incorporated herein by reference.

BACKGROUND

Internet-based social networking services provide a medium for millions of Internet users to interact with one another and share information. For examples, users are able to share digital content such as messages, comments, videos, images or hyperlinks to websites with other users in their networks. Customers can also express on social networking services their opinion and sentiment about brands, products, and services that they have experienced. The wealth of customer information and data available on social networking services provides great opportunities for entities such as businesses, institutions, and organizations who wish to understand their customers, predict social trends, and drive strategic business decisions.

SUMMARY

The present disclosure relates to obtaining user feedback from social media data.

In general, a first aspect of the subject matter of this specification can be embodied in methods that include obtaining search results including multiple social media posts provided on at least one social networking service, in which the multiple social media posts are associated with an entity, applying a pronoun filter to the multiple social media posts to obtain a filtered set of social media posts, each social media post in the filtered set including at least one pronoun from a pronoun list, and analyzing the filtered set of social media posts to identify trends or sentiments related to the entity.

Other implementations of this first aspect include corresponding computer systems, apparatus, and computer programs recorded on one or more computer storage devices, each configured to perform the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other implementations can each optionally include one or more of the following features, alone or in combination. For example, in some implementations, the at least one social media post includes a reference to the entity. In some implementations, the reference to the entity includes at least one of a name of the entity, a username associated with the entity, a nickname associated with the entity, or adaptations of the entity name. In some implementations, at least one of the social media posts is published on a page provided by the social networking service and managed by the entity. In some implementations, obtaining the search results may include identifying, for each social media networking service, an application programming interface (API) offered by the social media networking service; sending at least one query to the social networking service through API for social media posts that are provided on the social media networking service and that are associated with the entity; and retrieving, in response to sending the query, the multiple social media posts. In some implementations, the methods can further include removing, from the search results, duplicate social media posts. In some implementations, the methods can further include removing, from the search results, social media posts that include a hyperlink. In some implementations, the pronoun list may include the pronouns "I," "I'm," "I'll," "I've," "me," "my," and "mine." In some implementations, analyzing the filtered set of social media posts may include performing natural language processing on the filtered set of social media posts; and identifying, based on an output of the natural language processing, sentiment expressed in each post of the filtered set of social media posts.

A second aspect of the subject matter of this specification can be embodied in methods that include identifying a social media post published by a first user on a social networking service, in which the social media posts include social media content originally distributed by a different user on the social networking service, identifying the first user who published the social media post including the social media content, determining that the identified user corresponds to a target audience, and sending, subsequent to determining that the identified user corresponds to the target audience, a targeted social media post on the social networking service to the identified user.

Other implementations of this second aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other implementations can each optionally include one or more of the following features, alone or in combination. For example, in some implementations, identifying the social media post may include sending at least one query to the social networking service through an application programming interface (API), in which the query includes a request for an identification of a social media post that includes the social media content originally distributed by the different user; and retrieving, in response to sending the query, the social media post published by the first user. In some implementations, determining that the first user corresponds to a target audience may include determining that a size of the user's social network exceeds a specified threshold. The methods may include subsequent to determining that the first user corresponds to a target audience, determining a ranking of the first user based on a size of the user's social network. The methods may include determining a time frame during which the social media post was published by the identified user; and sending the targeted social media post to the identified user during the same time frame.

A third aspect of the subject matter of this specification can be embodied in methods that include obtaining multiple social media posts provided on at least one social networking service, applying a pronoun filter to the multiple social media posts to obtain a filtered set of social media posts, identifying, among the filtered set, a social media post has shared original social media content, identifying, a user who distributed the at least one social media post, determining that the identified user corresponds to a target audience, and sending a targeted social media post on the social networking service to the identified user.

Other implementations of this third aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The systems and methods described herein can enable businesses to achieve operational efficiencies from both technical and business perspectives. From the technical perspective, the pronoun filter can enable a significant reduction in the number of social media posts that need to be reviewed and thus increases machine processing and computational efficiencies. For instance, in some implementations, a business may be interested in reviewing social media posts across multiple social networking services that reference the business, the business's products, the business's services, the business's competitors, and/or the business's industry. The number of available social media posts about the business itself across the different social networking services may be tens of millions of posts per month. Alternatively, if the business searches for posts about the business's industry (for example, in the technology, banking, or insurance industry), the number of posts may be several hundreds of millions of posts per month. To analyze such large numbers of social media posts, the business may be required to make significant investments in resources such as data storage, machine processing power, computation time, and labor force. The systems and methods described herein enable the business to focus instead on a small percentage of the search results and reduce costs associated with processing social media posts. For example, the business can reduce data processing workload and data storage needed.

In addition, the reduced number of search results may allow for data processing in primary storage (e.g., internal memory). In many cases, data processing in the primary storage requires less computation time, and in some cases, it can enable for real-time computation. Therefore, in some cases, the business can obtain real-time feedback from customers and become more agile in identifying and acting in response to customer feedback. By focusing on social media posts that include customer feedback, business units such as customer service departments can be much more efficient and effective in responding to actual service or technical issues mentioned in these posts. This can provide a competitive advantage in the business's ability to position itself against its competitors.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Internet-based social networking services provide a medium for millions of Internet users to interact with one another and share information. For example, users are able to share digital content with other users in their social networks by posting new content or posting comments on content posted by other users.

In some cases, the content published on social networking services includes posts in which a user of the social networking service expresses their opinion and/or sentiment about brands, companies, products, and/or services that the user has experienced. A single social networking service may provide billions of posts shared by millions of users per month. The large numbers of posts available on social networking services can, in some implementations, provide opportunities for entities such as businesses, institutions, and organizations to better understand their customers, predict social trends, and drive strategic business decisions.

By collecting and analyzing social media posts, entities, such as businesses, can identify user feedback that is relevant to the businesses (e.g., customer feedback) and address the users' concerns or service issues. Businesses can also identify a target audience for a social media post (e.g., an advertisement) by analyzing historical activities of one or more users on social networking services. The present disclosure relates to systems and methods for enhancing identification of user feedback from social media posts and for identifying a target audience from social media posts.

Filtering User Feedback from Social Media Posts

User feedback (e.g., customer feedback) has a significant value to businesses because it can help businesses identify service issues as well as improve their products and/or services. In other words, customer feedback enables businesses to achieve better customer satisfaction, which can lead to increasing customer base and revenue stream. However, in some cases, obtaining customer feedback is a difficult and time-consuming task as many customers are not willing to give feedback. Social networking services are good resources for finding customer feedback, because the content published on social networking services may include posts in which a user of the social networking service gives feedback about the businesses. However, it may be difficult to distinguish comments or remarks made by individuals, such as customers, from comments or remarks that have little or no value (e.g., comments/remarks made by the businesses themselves or comments/remarks that are spam). To better identify user comments made by individuals, the systems and methods disclosed herein employ, in part, a pronoun filter to filter the social media posts. The pronoun filter allows a business to quickly identify posts that include actual customer feedback, opinions, or sentiments about the business.

Figure 1:
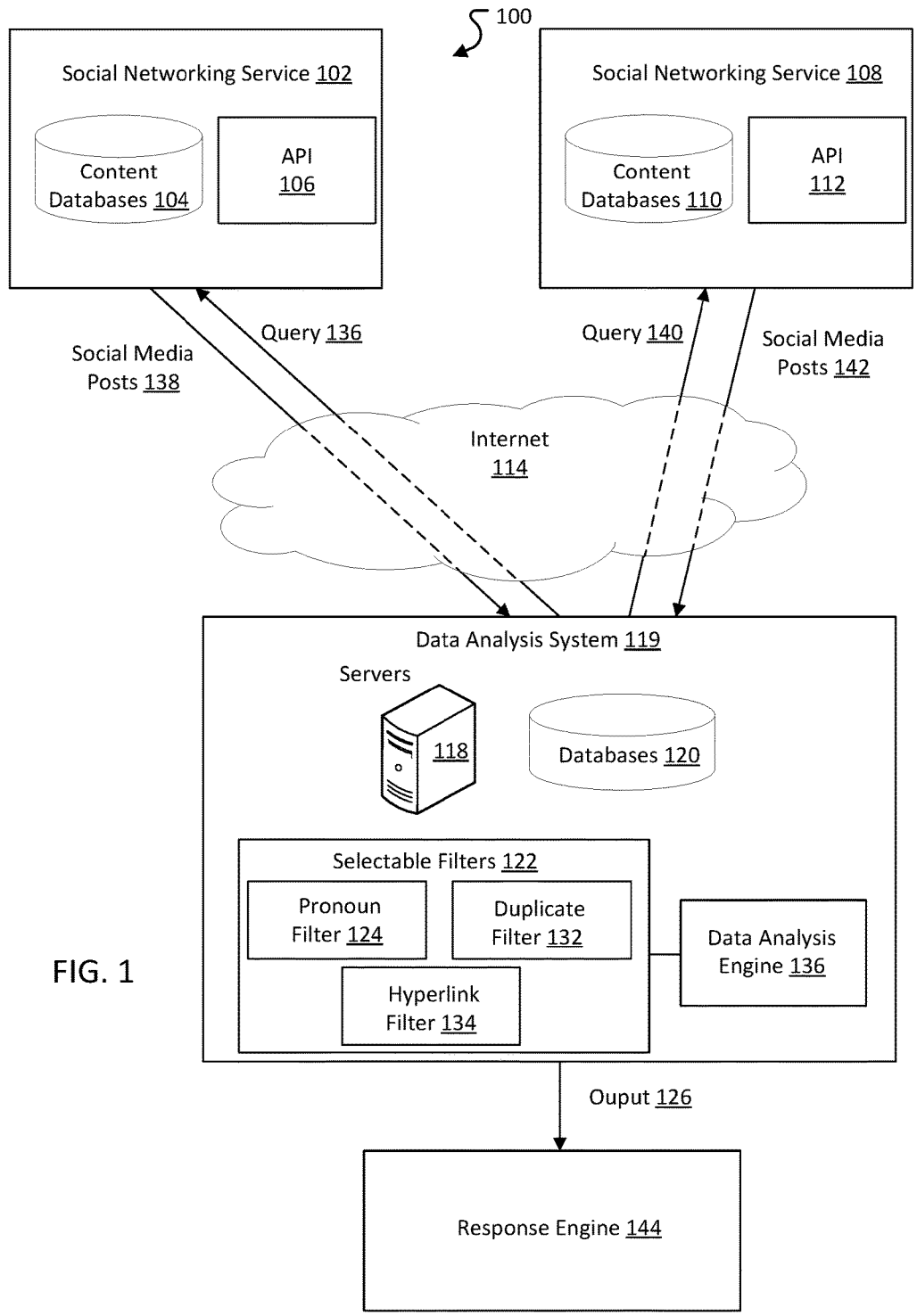
FIG. 1 is a schematic that illustrates an example system for filtering customer feedback from social media posts.

FIG. 1 is a schematic that illustrates an example system 100 for filtering customer feedback from social media posts provided on social networking services. The system 100 can include a social networking service 102, a social networking service 108, and a data analysis system 119. A social networking service provides a social networking website and/or application that allows users to create profiles and establish connections, and share information/interests with other users of the social networking service. Examples of social networking services include social networking sites (e.g., Facebook® and LinkedIn®, and g+™) microblogging sites (e.g., Twitter®), blogging sites, photo sharing sites, video sharing sites (e.g., YouTube™), rating sites, and various other services that allow users to post, view, and react to digital content generated by other users. In some implementations, a social networking service may require users to create an account that is associated with a corresponding username identifying the user on the social networking service. A user then can publish on the social networking service a social media post associated with the user's username. The social media post can include, but is not limited to, publication of digital content, a new message to another user on the social networking service, a reply to a message received from another user on the social networking service, a comment on content posted by another user, or a message that includes content posted by another user. The social media post may include text, images, video, audio, and/or links (e.g., hyperlinks) to such content or webpages that host such content.

In some implementations, a social networking service also allows users to perform one or more "engagement activities" in response to a social media post. Examples of an engagement activity include, but are not limited to, selecting a button or selector indicative of the user's endorsement of the social media post (for example, clicking on a "Like" button provided by Facebook® and LinkedIn®, and clicking on "plus one" button provided by g+™) selecting a button or selector to receive updates about a user or a company who has posted the post (for example, clicking on "Follow" button provided by Facebook®, LinkedIn®, and Twitter®), and visiting a website listed in the post (e.g., by clicking on a hyperlink included in the post).

In some implementations, a social networking service, such as 102, may include an application programming interface (API), such as an API 106, and content databases (e.g., content databases 104). An API includes a set of programming instructions, protocols, standards, and tools for building a software application that can accomplish specific tasks or is able to interact with another software application. An API offered by a social networking service allows a third party to develop a software application that can be integrated to the social networking service or can interact with the social networking service. In some implementations, an API can include a tool that may be downloaded and run on a computer system of the third party. The third party can use the tool to build a software application for connecting and communicating with the social networking service. For example, the third party can use the software application to send one or more queries conformed to the API to the social networking service in order to retrieve, insert, update, or delete information on the social networking service. The content databases 104 may include social media posts generated and distributed by users of the social networking service 102. Content database 104 may also include statistical data related to users or activities of users of the social networking service 102.

In some implementations, a social networking service (for example, Facebook® and LinkedIn®) can allow an entity such as a business to create a page where the business and users of the social networking service can publish social media posts. For example, the business can present a profile of the business and other information associated with the business on the page. Users who publish new posts or comments about the business on the page do not need to include a reference to the business (e.g., mention a name of the business) in their posts, because publishing a post on the page implies that the post refers to the business.

As shown in the example of FIG. 1, the data analysis system 119 includes servers 118 and databases 120 and communicates with the one or more social networking services 102, 108. The servers 118 and databases 120 can be operated by or on behalf of an entity such as a business. In order to collect customer feedback from one or more social networking services (e.g., services 102 and 108), the system 119 can be configured to obtain social media posts associated with the business that have been published/distributed on these services through a network (for example, the Internet 114). In some implementations, the data analysis system 119 may be configured to send one or more queries (for example, a query 136) to the social networking service 138 in order to retrieve the social media posts. The one or more queries may have a syntax conformed to the API 126 and may include a keyword or phrase that includes a reference to the business. The retrieved search results from the social networking service 102 can be stored at the databases 120. The servers 118 and the databases 120 can be located at one site or distributed across multiple sites and interconnected by a data communication network. The databases 120 may be provided as a database management system, an object-oriented database management system, a relational database management system (e.g., Oracle, Access), a file system or other appropriate database package. In some implementations, the databases may be accessed using a Structure Query Language (SQL) or other appropriate tools for accessing databases.

The system 119 can further include selectable filters 122 that are configured to filter the search results stored in the databases 120 to obtain a filtered set of social media posts that include customer feedback. For example, in some implementations, the selectable filters 122 includes a pronoun filter 124 that is capable of separating posts based on whether they include one or more pronouns from a list of pronouns. In some implementations, the selectable filters 122 include a duplicate filter 132 that removes duplicate posts and/or a hyperlink filter 134 that removes posts that include a hyperlink to a website. Depending on purposes of the analysis of the search results, the one or more of the filters can be applied to a set of social media posts.

The system 119 can further include a data analysis engine 136 that is configured to analyze the filtered set of social media posts to identify customer feedback and generate an output 126. As shown in FIG. 1, the system 119 can be configured to transmit the output 126 to a response engine 144 of the system 100. The response engine 144 can be configured to perform one or more actions in response to receiving the output 126 from the system 119 by virtue of having software, firmware, hardware or a combination of them installed on the engine 144. The response engine 144 can be implemented by using a single electronic computing device (e.g., a server) or multiple interconnected electronic computing devices (e.g., multiple servers) including, for example, the same server or servers on which the data analysis system 119 operates. In some implementations, the response engine 144 may be operated by a business unit of the business, for example, a customer service department, marketing department, sale department, public relation department, information technology department, or other departments that want to utilize customer feedback to improve or promote their services and/or their products.

Figure 2:
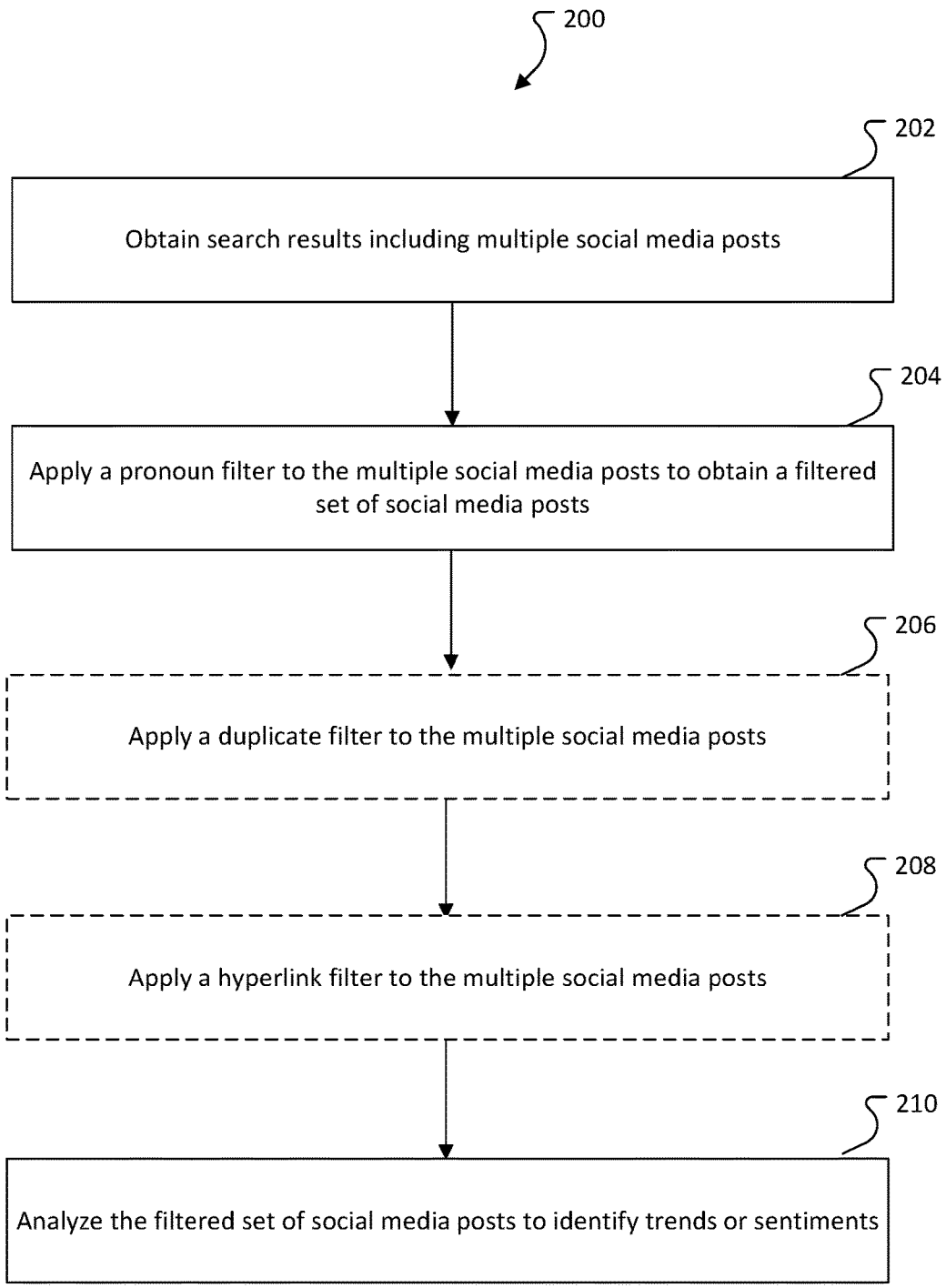
FIG. 2 is a flowchart of an example process for filtering customer feedback from social media posts.

FIG. 2 is a flowchart of an example process 200 for filtering customer feedback from social media posts. The process 200 may be performed by a system such as data analysis system 110. The process 200 includes obtaining (202), from one or more social networking services, search results that include multiple social media posts published on the one or more social networking services. Each of the multiple social media posts may contain content related to a search query (e.g., content that is relevant to a business such as customer/user feedback on a business, organization, product, or service).

Social media posts that are relevant to a business can include, for example, references to the business such as a name of the business, a username associated with the business, a nickname associated with the business, or adaptations of the business name. In addition, or alternatively, the social media posts may include references to products, services, or brands associated with a business. For example, the business may launch a new product and want to obtain posts that include customers' feedback and sentiments about the product or comparison with competitors' products.

The social media posts may be obtained in different ways. In some implementations, the system 119 is configured to search for social media posts that contain desired content on different social networking services. The system 119 can identify an application programming interface (API) offered by each social networking service that the business has access to. For example, in some implementations, the system 119 identifies that APIs 106 and 112 are provided by the social networking service 102 and 108 respectively. The system 119 can send a query 136 to social networking service 102 and send a similar or different query 140 to social networking service 108. A query can include a syntax supported by a corresponding API and may include a keyword or phrase that the system 119 uses to search for relevant posts. For example, the system 119 can search for posts that include a name of a particular entity (e.g., the business or competitors of the business). The system 119 can also search for various misspellings or other representations/adaptations of the name of the entity. In addition, the system 119 can search for various usernames associated with the entity including, for example, one or more usernames that a business established with one or more different social networking services. When the name of the entity is a publicly known or used term, a search engine (e.g., Google AdWords™) can be used to obtain various ways that people type in the name of the entity for searches. For instance, the system 119 can be configured to input a keyword, such as a business name, to a keyword recommendation tool of a search engine in order to find searches that are similar to the keyword. Subsequently, the keyword recommendation tool can provide the system 119 with a list of top searches that the tool has determined are similar to the business name. The provided list can include a variety of variations in spelling of the business name.

After sending one or more queries that include keywords using one or more APIs, the system 119 retrieves search results that include social media posts from the social networking services (e.g., social media posts 138 and 142), in which the published content of the social media posts matches the criteria specified in the original query or queries. The search results can be stored at the databases 120.

In some implementations, a user maintains one or more webpages hosted by the social networking service (e.g., users on the Facebook® social networking service maintain their own "Facebook®" pages). In such cases, the system 119 can perform a search on one or more of the hosted webpages for the desired content. For example, when searching for social media posts related to a product or service offered by a business (e.g., customer feedback), the system 119 can search one or more webpages maintained by the business and hosted on a social networking service to identify relevant posts. The identified posts can be included as part of the search results. The social media posts that are of interest (e.g., posts from customers but not from the business itself) may not mention the name of the business or adaptations of the name of the business because the social media posts are published on the business's own pages and thus implicitly refer to the business. In order to identify relevant social media posts (e.g., customer or other user feedback on the business, the business's products or the business's services), the system 119 can remove the business's posts on its own pages by sending a query to each social networking service through a corresponding API. The query can remove search results where the username associated with the post is the business's username. The servers 118 can then obtain search results that do not include the business's posts and store the search results at the databases 120. The process of removing social media posts published by a specific entity, such as a business, is not limited to removing such posts from websites but can be extended to any applicable social networking service platform.

For organizations interested in a user's or a customer's individual feedback, the search results obtained from the API may still include a large number of social media posts that are not relevant. To further refine the search results and better identify user/customer feedback, the process 200 includes applying (204) a pronoun filter to the multiple social media posts to obtain a filtered set of social media posts, in which the published content of each social media post in the filtered set includes one or more pronouns from a pronoun list.

For example, the pronoun filter 124 of the system 119 can be configured to filter the search results stored in databases 120 to obtain a filtered set of social media posts in which the text of the posts includes a pronoun or a combination of pronouns from a list of pronouns. For example, the list of pronouns may include one or more of "I," "I'm," "I'll," "I've," "me," "my," and "mine." Social media posts that include one or more pronouns from the above list are more likely than not to be made by individuals, such as actual customers, who are commenting on the organization, rather than posts made by the organization itself or spam. By applying the pronoun filter 124, the system 119 can more quickly and accurately identify social media posts that include comments from individuals relating to customer feedback, opinions, or sentiments about an organization (e.g., a business or its competitors) or other topic of interest. The pronoun list is not limited to the pronouns identified above. In some implementations, the pronoun list includes additional pronouns such as "you," "he," "she," "him," "her," "his," "hers," "they," "them," "we," and/or "us," among other selected pronouns. The pronoun list includes a single pronoun or may include 2 or more pronouns, such as 3, 4, 5, 6 or 7 pronouns. The filter 124 in the foregoing example is applied to search results that have been initially narrowed by removing those posts published by a specific entity or entities. However, the filter 124 may be applied before removing posts published by a specific entity or entities. Alternatively, the filter 124 may be applied without removing posts published by a specific entity or entities.

In some implementations, the filter 124 can include one or more rules as to how posts containing pronouns are filtered. As an example, the filter 124 can utilize additional keywords in conjunction with specific pronouns to remove posts that are not relevant. For instance, the filter 124 can be configured to obtain any social media post that contains the pronoun "I" and a name of a business. But when looking for posts that include the pronoun "you" and the name of the business, the same filter 124 may exclude posts that contain one or more specified/predetermined keywords in addition to the name of the business and the pronoun "you." Other rules for extracting posts that contain pronouns also may be applied.

In some implementations, the search results produce multiple copies or duplicates of the same social media post. A duplicate social media post contains content that is copied from a prior social media post published on the social networking service. A duplicate post can be created when a user shares a post published by another user on a social networking service (e.g., by clicking on a "Share" button associated with a post on Facebook® or LinkedIn®, or by clicking a "Retweet" button associated with a post on Twitter®). To avoid including these duplicates in the search results, the system 119 can apply (206) a duplicate filter 132 to the search results. The duplicate filter 132 is configured to filter out social media posts that are duplicates of another post within the social networking service. Applying a duplicate filter 132 is optional. In some implementations, the duplicate filter 132 identifies duplicate posts based on an analysis of metadata that is provided along with a post. Metadata provided along with a post includes multiple data fields, in which each data field includes a value or content that provides information about the post itself. For example, the metadata may include a "Date" data field and/or "Time" data field that indicates when the post was published on a social networking service. A value of the "Date" data field associated with the post can be, for example, "Dec. 12, 2010", and a value of the "Time" data field associated with the post can be, for example, "11:50 AM". In addition, or alternatively, the metadata may include an "Author" data field that indicates a username of an author who published the post. A value of the "Author" data field can be, for example, "PeterSmithNY". In addition, the metadata associated with a post can include, for example, a "Shared" data field that includes a value indicative of whether the post is a shared post (e.g., a post that shares content included in another post) or whether the post is an original post. For example, a value "1" may indicate that the post is a shared post and a value "0" may indicate that the post is an original post. The filter 132 can analyze metadata to determine if a post is a shared post based on the "Shared" data field associated with the post. If the filter 132 determines a post includes shared content, the filter 132 can further analyze the content of the post (e.g., the published text within the post) to determine whether the post includes additional information beyond the content of the post that is being shared. If a post only includes content of a post that is being shared, the filter 132 can, in some implementations, remove the post because it is considered a duplicate. If, however, a post includes additional content different from the content of a post being shared, (e.g., a comment on the subject matter of the original post), the filter 132 can, in some implementations, keep or remove the post based on the subject matter of the additional information (e.g., if the additional information contains a reference to a business or a topic of interest identified by the filter 132, the filter 132 keeps the post). By removing duplicate posts from the search results, the results provided by filter 132 are limited to the original social media posts containing the desired content (e.g., comments that users/customers made about a business or businesses). Applying the duplicate filter is optional based on of the desired analysis of the search results. In some implementations, it may be advantageous to keep duplicate posts to determine whether a particular post from a user/customer gained interest from other users.

In some implementations, social media posts that include hyperlinks are likely to include spam messages. These spam messages may be posted frequently on social networking services in order to increase the visibility of a website or a webpage in a search engine (e.g., increase search engine optimization) and thus may not provide value to an organization seeking to obtain feedback on their product and/or services. To remove such social media posts, the system 119 can optionally apply (208) a hyperlink filter 134 in addition to or as an alternative to one or more of the other filters. The hyperlink filter is configured to filter out social media posts that include a hyperlink to another source of information (e.g., a website, a document, or an image). The duplicate filter 132 can identify posts including hyperlinks by searching for indicators of a hyperlink within the social media post (for example, searching for the text "www," "http," or text that has been underlined and/or a different font color from other text in the social media post). In some implementations, after identifying posts with hyperlinks, the hyperlink filter 134 removes the identified posts from the search results. Alternatively, in some implementations, the filter 134 removes a specified subset of social media posts that contain hyperlinks. For example, in some implementations, the filter 134 is configured to remove social media posts including hyperlinks that direct users to websites other than one or more specified websites. This can include, for example, keeping posts having hyperlinks that direct users to a website associated with a particular business or competitors of the business while removing social media posts having hyperlinks that direct users to other websites unrelated to the business.

Once the social media posts have been filtered, the process 200 further includes analyzing (210) the filtered set of social media posts to identify trends or sentiments related to the business. For example, the data analysis engine 136 may include a text analytics tool configured to analyze one or more of the social media posts contained in the filtered set of posts. A text analytics tool is configured to categorize social media posts into one or more different themes and/or topics based on specific keywords or a specific combination of keywords included in the text of the social media posts. For instance, the text analytics tool may be configured to perform natural language processing (NLP) on text of the filtered set of social media posts. NLP is a technology that enables computers to perform rule-based analysis of human language. Based on an output of the NLP, the data analysis engine 136 may identify a sentiment expressed in each post of the filtered set of social media posts. The sentiment can include, for example, a positive sentiment, a neutral sentiment, or a negative sentiment. In addition or as an alternative, based on an output of the NLP, the data analysis engine 136 can determine if a post mentions a customer service or technological issue. For example, the engine 136 can determine that a post that includes a keyword from a predetermined set of keywords including, for example, "representative," "sale associate," "customer service," or "call center" is likely to mention a customer service issue. In another example, the engine 136 can determine that a post mentions a technological issue if the post includes a keyword from a predetermined set of keywords including, for example, "technical issue," "technical problem," "slow download time," or "slow response time." In addition, or alternatively, based on an output of the NLP, the data analysis engine 136 may identify a target audience to market a product or service based on what users publish in their posts. For example, the data analysis engine 136 may identify a user frequently publishes social media posts that include keywords related to health care and health insurance policies. The data analysis engine 136 may identify that the user is a target audience to which a new health insurance product or other insurance products can be marketed. In addition, the data analysis engine 136 may classify posts in the filtered set of social media posts, for example, in accordance with references, topics, or sentiments expressed in the posts. The data analysis engine 136 may also classify users into different groups of users, for example, in accordance with topics that the users discuss in their posts (e.g., banking, auto insurance, and retirement plans). For example, the engine 136 may determine that a user has published a number of posts related to banking over a predetermined period of time (e.g., a day, a week, a month, a quarter or a year), in which the number of posts related to the topic over that time period exceed a predetermined threshold (e.g., 10 posts, 20 posts, 30 posts, or 40 posts). If the number of posts related to the topic exceeds the predetermined threshold, the engine 136 may then classify the user in a banking group.

After analyzing the filtered set of social media posts, the data analysis engine 136 may generate an output 126. The output 126 can optionally include one or more of the following features, individually or in combination. In some implementations, the output 126 includes the published text extracted from one or more of the filtered set of social media posts. In some implementations, the output 126 includes the published text extracted from the filtered set of social media posts, in which the only posts from which the text is extracted are those classified as being associated with a particular sentiment by the data analysis engine 136 (e.g., only those social media posts classified as having a negative sentiment or only those social media posts classified as having a positive sentiment). The output 126 can include only texts extracted from the filtered set of social media posts, in which each text refers to a technical or service issue. The output 126 can include a list of usernames, in which each username is associated with one or more posts from the filtered set of social media posts that they published. The output 126 can include statistical data such as, for example, a number of social media posts that expresses a positive sentiment about a business, a number of posts that expresses a neutral sentiment about a business, and/or a number of posts that expresses a negative sentiment about the business. For any given post, the output 126 can include data associated with the post such as a name of the author of the post (e.g., a username), a number of users which whom of the author has established a connection (e.g., a number of friends the author made on a social networking service, a number of people who chose to receive updates from the user, for example, by selecting "Follow" button offer by Facebook®, LinkedIn®, or Twitter®), content of the post, sentiment of the post, one or more categories/themes that the post is classified to, and data and time of the post. Data associated with the post may also include a metric indicative of a level of influence that the author of the post has in social media based on how people have performed engagement activities with the author's published posts in the past.

The response engine 144 may be configured to receive the output 126 and perform actions in response to receiving the output 126. For example, the response engine 144 may transmit a portion of the output 126 that includes a text corresponding to an issue to an appropriate business unit that can address the issue (e.g., sending a message (e.g., e-mail or instant message) that mentions a technical issue to an appropriate contact within an IT department of a business and/or sending a message (e.g., e-mail or instant message) that mentions a product issue raised by a customer in a social media post to a customer service department). In another example, the response engine 144 may be configured to send a response message to a user who asked a question or reported an issue in a social media post. In some implementations, the response engine can be configured to send a list of different groups of users, in which each group is interested in a particular topic, to an appropriate business unit that can utilize the list, for example, for distributing advertisements or storing in a database for future marketing campaigns. In some implementations, the response engine 144 can utilize the output 126 to predict a level of impact of an operation of a business on customers and a trend of the impact (e.g., whether the impact is increasing or decreasing). For example, the engine 144 may determine that a significant portion of the output 126 includes text referring to a mobile banking application provided by a business that allows customers to access a bank account and conduct financial transactions via a mobile device. The engine 144 may determine that the text includes customer complaints about slow response time of the application. To increase customer satisfaction and/or expand customer base, the business might respond to this information by investing in technology to improve response time (for example, by investing on infrastructure such as increasing a number of servers to reduce time to download a page). The engine 144 can monitor the output 126 over time to determine the impact of the business's investment among users by, e.g., identifying a change in the customer sentiment. For example, the engine 144 can determine whether there is an increase or decrease in the amount of positive feedback and/or negative feedback related to the mobile banking application included in the output 126.

Identifying a Target Audience Based on Social Media Posts

Social networking services provide organizations with opportunities to send content (e.g., advertisements) to a large number of users of the social networking services. The purpose of sending content to users may be to influence them into changing behavior or performing an activity (e.g., purchase a new product or distribute the content to other users). In order to maximize the effect of the content that is sent, an organization, such as a business, aims to identify users who are better-suited for the content instead of sending the content to a broad range of audience, e.g., targeting advertising towards particular individual users or groups of users on the social networking services. This section relates to identifying a target audience based on social media posts and sending content to the target audience. To identify a target audience, a system locates social media posts that include shared content, in which the shared content relates to an entity or topic of interest. For instance, the shared content can include an advertisement that a particular business published on a social networking service. Having identified the social media posts that include the shared content, the system then can identify the users responsible for distributing those social media posts, i.e., the users that are more likely than not to be interested in the content that has been shared. The identified users can then be classified as part of a target audience for delivering future content in the social networking service.

The techniques described herein can enable an organization to achieve operational efficiencies from both business and technical perspectives. For example, in some implementations, the techniques described herein enhance the return of investment of social marketing campaigns by driving significantly higher engagement of target audience while potentially decreasing funds spent on marketing. This is because the content is issued primarily to users that are much more likely to be interested in and receptive to the content. This can attract more potential customers for a business, thus providing the business with a competitive advantage over its competitors. In some implementations, the techniques described herein can enable significant machine efficiencies in delivering advertising content on social networking services. In particular, the volume of advertisements that are sent to users can be substantially reduced because advertisements are sent to a targeted audience rather. The reduced volume of advertisements can, in some implementations, reduce machine processing power to deliver advertisements to users of the social networking services.

Figure 3:
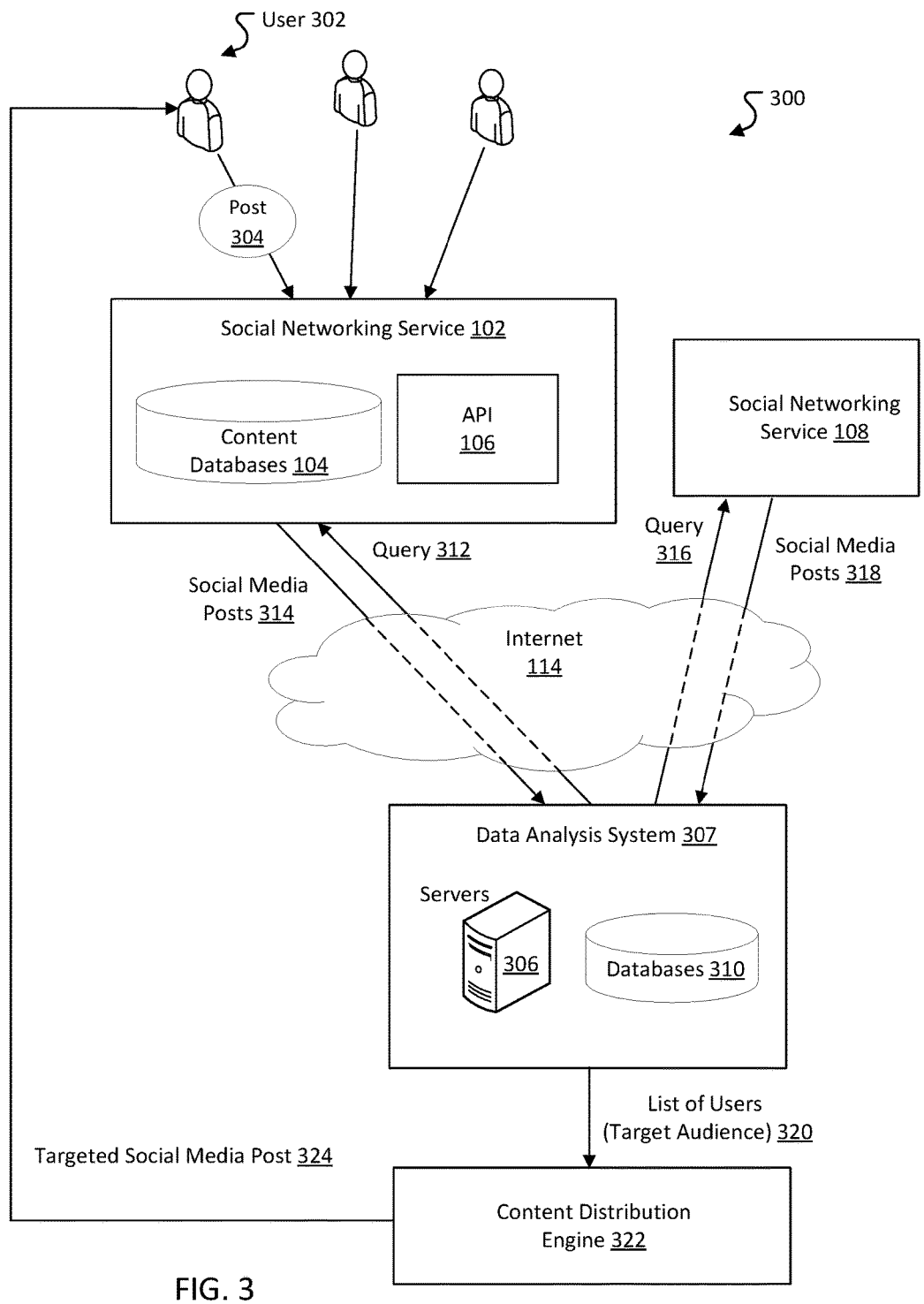
FIG. 3 is a schematic that illustrates an example system for identifying a target audience and sending a social media post to the target audience.

FIG. 3 is a schematic that illustrates an example system 300 for identifying a target audience and sending a social media post to the target audience. In particular, the system 300 is configured to identify one or more social media posts that have shared social media content on a social networking service. The system 300 is also configured to identify the user or users responsible for distributing the social media post, determine whether the identified user(s) correspond to a target audience and, if so, send a targeted social media post on the social networking service to the identified user(s).

As shown in FIG. 3, the system 300 can include social networking services such as social networking services 102 and 108 as described in the description associated with FIG. 1. In addition, the system 300 can include a data analysis system 307. The system 307 can include servers 306 and databases 310. The servers 306 and the databases 310 can be located at one site or distributed across multiple sites and interconnected by a data communication network. The databases 310 may be provided as a database management system, an object-oriented database management system, a relational database management system (e.g., Oracle, Access), a file system or other appropriate database package. In some implementations, the databases may be accessed using a Structure Query Language (SQL) or other appropriate tools for accessing databases.

In order to identify a target audience to which social media content (e.g., an advertising message) should be distributed on the social networking services 102, 108, the data analysis system 307 can be configured obtain and analyze social media posts from the social networking services. For example, the system 307 can be configured to obtain social media posts that that reference a particular entity (e.g., customer feedback related to the product and/or services of a business). The collection of such social medial posts can be obtained, for example, from the output 126 of the system 100 shown in FIG. 1 or other system that performs the process described with respect to FIG. 2. Alternatively, or in addition, the system 307 can be configured to send a query 312 to a social networking service to retrieve social media posts 314 that include specific type of content (e.g., a particular advertisement). In either case, the social media posts obtained by the data analysis system 307 can be stored in the databases 310. The data analysis system 307 can be configured to analyze the social media posts stored in databases 310 to identify one or more users as a target audience for distributing a targeted social media post.

As show in FIG. 3, the system 300 can further include a content distribution engine 322 coupled to the data analysis system 307. The content distribution engine 322 can be implemented on one or more servers. The content distribution engine 322 can be configured to obtain a list of target audience from the data analysis system 307 and to send one or more targeted social media posts 324 to any one of the users specified in the target audience list.

Figure 4:
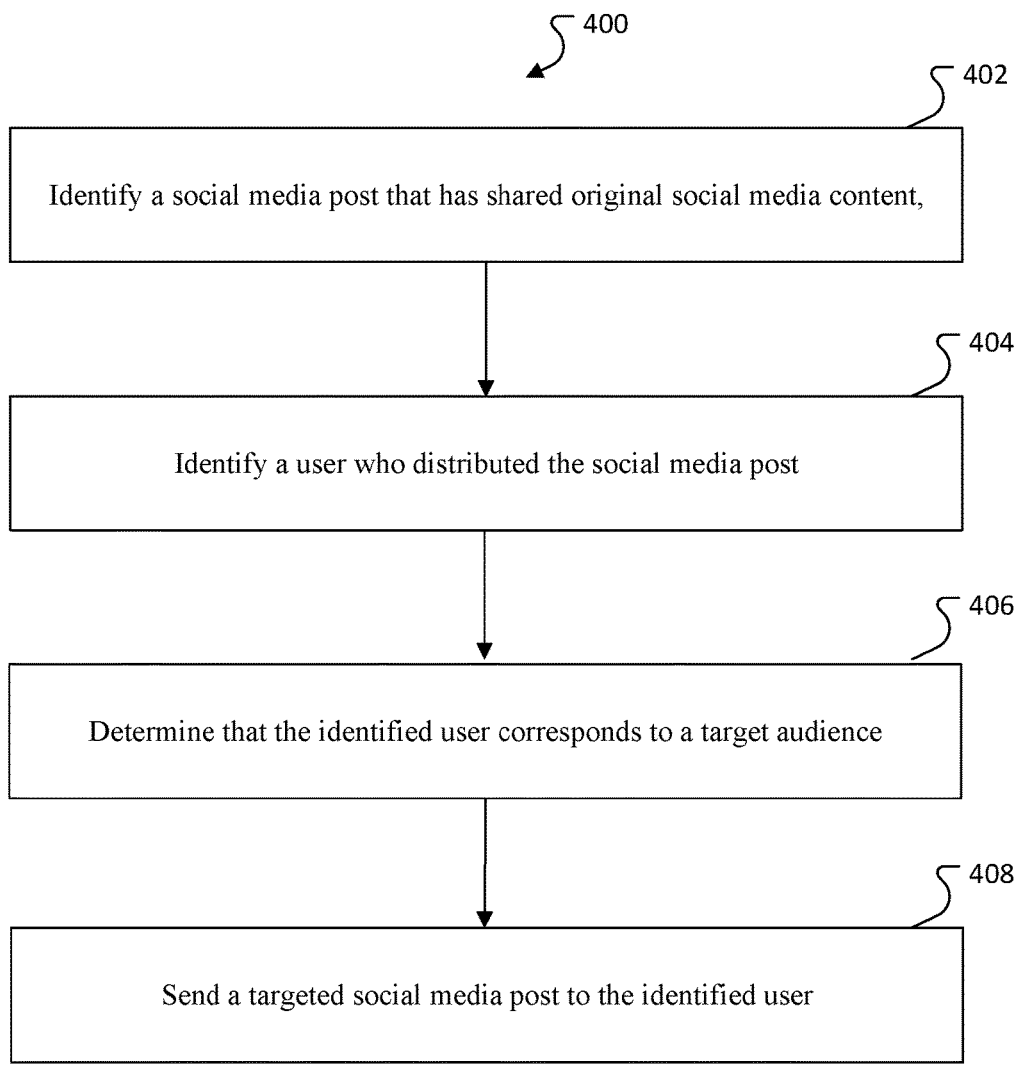
FIG. 4 is a flowchart of an example process for identifying a target audience and sending a social media post to the target audience.

FIG. 4 is a flowchart of an example process 400 for identifying a target audience and sending a social media post to the target audience. The process 400 may be performed, for example, by data analysis system 307. In a first step, the process 400 includes identifying (402) one or more social media posts that have shared social media content, in which the social media post is provided on a social networking service. The shared social media content includes, for example, content that was originally distributed/published by another user on the social networking service (e.g., a re-tweet on Twitter®). Shared social media content may include the original social media content that was originally published/distributed by another user as well as additional content (e.g. comments on the original social media content). For instance, the data analysis system 307 shown in FIG. 3 can be configured to obtain social media posts that contain content that an entity (e.g., a business or the business's competitors) originally distributed/published on the social networking service. Alternatively, or in addition, identifying (402) the social media post(s) can include, for example, searching one or more social networking services for social media posts that include published content pertaining a predefined subject or entity. This can include, in some implementations, searching for posts pertaining to a particular business or business and/or posts that contain specific content (e.g., advertising content).

In an example scenario, a business may plan to launch a Veteran's Day marketing campaign on one or more social networking service and wishes to identify users of the one or more social networking services who regularly engage with military themed content in social media, even if such users have no direct connection to the business (e.g., they are not customers of the business) and/or have not published any social media posts related to the business. To identify the users, the system 307 may search for social media posts related to the content of interest (e.g., military themed content) that have been shared on the social networking service. Alternatively, or in addition, the system 307 may search for social media posts that have shared military themed content that the business (and/or the business's competitors) have originally distributed on the social networking service.

Searching for those social media posts can include directing a query to a social networking service through an API (e.g., API 106) provided by the social networking service of interest. In response to the query, the social networking service that provides the API can provide different levels of access to posts that are published on the service. For example, in some implementations, the social networking service provides, in response to the query, specific search results that include one or more social media posts that match the content identified in the query. Alternatively, or in addition, the social networking service provides a continuous stream of data that can be stored and searched by a system (e.g., system 307). For example, the system 307 can send, through the API, one or more queries 312, 316 to the social networking service(s) 102, 108. The queries 312, 316 include a syntax conformed to the API and may include a keyword or phrase that the system 307 use to search for relevant posts. For example, the system 307 can search for posts that include "veteran," "military," or adaptations of these keywords. When searching for social media posts that have shared content originally distributed by another user of the social networking service, the query can include exact keywords and/or phrases included in the original content. The query can also include a request to obtain a username associated with each social media post included in the search results. After obtaining the search results that include the desired social media posts 314, 318 and a username associated with each post from the social networking services 102, 108, the social media posts 314, 318 can be stored at the databases 310.

The process 400 further includes identifying 404 one or more users who distributed the collection of social media posts obtained from the social networking service. For example, the system 307 may be configured to identify a username associated with each social media post stored in databases 310. Using the Veteran's Day marketing campaign example, the system 307 may identify the usernames of users that have shared military themed advertisements in the one or more social networking services.

The process 400 further includes determining 406 that the identified user corresponds to a target audience. For instance, the system 307 may be further configured to identify users who engage frequently with content related to the business or the content of interest based on a number of engagement activities that the users have performed in response to viewing the content. As an example, the system 307 can analyze content of posts published by a user over a predetermined period of time (e.g., a day, a week, a month, a quarter, or a year) and identify posts that include content related to the business or content of interest. The system 307 can determine a number of posts published by the user that include content related to the business or content of interest. If the number of posts exceeds a threshold over the predetermined period of time (e.g., more than 10 posts, more than 20 posts, more than 30 posts, or more than 40 posts), the user can be determined as a target audience. In another example, the system 307 can determine a number of times that a user has selected a button to indicate an endorsement of the content over a predetermined period of time (e.g., selecting a "Like" button associated content published on Facebook®). If the number of times exceeds a threshold, for example, more than 30 times a year, the system 307 can determine the user as a target audience. Alternatively, or in addition, the system 307 may be configured to analyze, among users who have shared original social media content, the size of each user's social network on a social networking service to identify those particular users who may reach a larger number of people if they share the targeted social media post. The size of each user's social network can be determined, for example, based on the number of other users with whom the user has established a connection (e.g., a number of friends the user made on a social networking service, a number of people who chose to receive updates from the user, for example, by selecting "Follow" button offer by Facebook®, LinkedIn®, or Twitter®). Users that have more followers and/or that share social media content more often are better suited for receiving social media content and expanding its reach given those users' wider audience and greater engagement with others on the social networking services. Such users then can be identified as a target audience and included in a target audience list 320 as shown in FIG. 3. For example, a user who has a size of social network exceeds a specified threshold (e.g., a user who has more than 200 followers) can be identified as a targeted audience and included in the target audience list 320. The target audience list 320 can include, for example, the usernames of identified users and may rank the users according to how frequently a user has engaged with the content and/or the size of the user's social network. For instance, a user 302 having a large number of followers on a social networking service may be ranked higher than a user with fewer followers.

Alternatively, or in addition, the system 307 may be configured to generate an influence score for a user, in which the influence score indicates a level of influence of the user in a social networking service. The influence score can be generated based on types of engagement activities (e.g., whether it is a comment or a selection of a button to indicate an endorsement of a post) and/or a number of engagement activities (e.g., how many comments) that other users performed after viewing posts published by the user in the past. Based on the influence score of the user, the system 307 can evaluate actual value of each user's social network rather than only relying on the size of the user's network. In some implementations, the influence score associated with a user is used in addition to the size of the user's network to assign a ranking to the user and to identify whether the user is a target audience to be included in the target audience list 320.

In some implementations, in order to increase the effectiveness of the advertising content, the system 307 may be configured to determine a time frame during which a targeted user is likely to engage with content, e.g., to re-post or share content originally distributed by another user on the social networking service. For example, some users may routinely access a social networking service only during a specific time of the day (e.g., the user 302 routinely accesses the social networking service 102 at 8 a.m. every morning), whereas other users may access the social networking service at a variety of times throughout the day. The system 307 can obtain this information by sending a query to a social networking service through a corresponding API. In addition, or alternatively, the system 307 can determine a time frame during which a user is more likely to engage with content. This time frame can be determined by analyzing the times associated with past social media posts published by the user and/or times that the user has engaged with social media posts published by others. The time information can be obtained by sending a query to a social networking service through a corresponding API. The query may include a username identifying the targeted user. Data regarding the time frame during which the user is likely to engage with content can be included in the target audience list 320. Determining a time frame during which a targeted audience routinely access a social networking service can significantly increase a chance that the targeted audience engages with content to be presented to the audience during the determined time frame. This helps to increase the effectiveness of advertising content and reduce a number of times advertising content needs to be distributed to the audience until the audience actually views and engages with the content. Therefore, operational and machine processing costs associated with distributing content to the targeted audience can be reduced. Furthermore, in some implementation, the number of different time frames during which a user accesses a social networking service can affect the ranking of the user in the target audience list 321. For example, a user 302 who accesses a social networking service five times a day may be ranked higher than a user who only uses the service once a day.

The process 400 further includes distributing (408) a targeted social media post on the social networking service to the identified user subsequent to determining that the identified user corresponds to the target audience. After identifying one or more users as a target audience and including those users in a target audience list 320, system 307 may be configured to send the target audience list 320 to a content distribution engine 322 as illustrated in FIG. 3. The content distribution engine 322 may be configured to send the targeted social media post through the one or more social networking services to users identified in the target audience list 320. The content distribution engine 322 may be configured to prioritize its distribution of the targeted social media post according to rankings of the users in the target audience list 320. For example, for high-ranked user accounts, the content distribution engine 322 may be configured to distribute the targeted social media post to these accounts more often to increase the likelihood that users associated with these accounts will see the post and engage with it. Prioritizing distribution of the targeted social media post may allow the business to more intelligently allocate the business's marketing budget to reach the maximum audience possible.

Alternatively, or in addition, in order to increase the probability that a user views and engages with the targeted post, the content distribution engine 322 may be configured to select the time to send out the targeted social media post to each user based on a time frame during which each user is likely to engage with the post (for example, the content distribution engine 322 may send targeted social media posts 324 to the user 302 at 8 a.m. every morning if that corresponds to the time that the user 302 is most likely to be reviewing their user account on the social networking service). The content distribution engine 322 may be configured to automatically purchase a plurality of ads for presentation of the targeted social media post to specific user accounts at specific times. For example, the engine 322 can submit a request to an ad platform (e.g., a software that handles submissions of ad requests) provided by a social networking service for purchasing advertisement slots on a corresponding social networking website. In other words, instead of purchasing a single ad to run at one time at a broad range of audience, the content distribution engine can purchase a plurality of hyper-targeted ads, which refer to ads that are able to deliver advertising content based on criteria specified in a request submitted by the content distribution engine. As an example, the criteria may include a targeted user or group of users to whom an ad should be presented. Additionally, or alternatively, the criteria may include a time frame during which an ad should be presented. Additionally, or alternatively, the criteria may include a duration of time (e.g., a week or a month) during which the ad should be presented to a targeted user or group of users. Additionally, or alternatively, the criteria may include how frequent that an ad should be presented (e.g., every day or every other day).

After an ad is displayed on a social networking service, the engine 322 may receive from the service information about performance of the ad. For example, the information about performance of an ad of a new product may include a number of times users have performed engagement activities in response to viewing the ad (e.g., selecting a hyperlink included in the ad, purchasing the new product after viewing the ad). Based on the information, the engine 322 can automatically tailor future ad requests for purchasing ads based on factors that the engine 322 identifies as driving the most success of an ad (e.g., a number of purchases).

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the invention can be realized in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementation s are within the scope of the following claims. For example, the actions recited in the claims can be performed in a different order and still achieve desirable results.

What is claimed is:

1. A computer-implemented method comprising:
   obtaining, by at least one processor, search results comprising a plurality of social media posts provided on at least one social networking service, wherein each social media post of the plurality of social media posts comprises a reference to a business entity;
   applying, by the at least one processor, a pronoun filter to the plurality of social media posts to obtain a filtered set of social media posts, each social media post in the filtered set comprising at least one pronoun from a pronoun list;
   identifying, among the filtered set of social media posts, at least one social media post that has shared an original content item;
   identifying a user who published the at least one social media post on the at least one social networking service;
   determining that the identified user corresponds to a target audience;
   identifying an application programming interface (API) offered by the at least one social media networking service;
   sending, to the at least one social networking service, a query that conforms with the API to obtain at least one of (i) times associated with social media posts previously published by the identified user, or (ii) times when the identified user has engaged with social media posts published by other users, wherein the query comprises a username of the identified user;
   analyzing the obtained times to determine a time frame during which the identified user routinely accesses the at least one social networking service; and
   targeting a second content item to the identified user during the determined time frame.

2. The method of claim 1, wherein the reference to the business entity comprises at least one of a name of the business entity, a username associated with the business entity, a nickname associated with the business entity, or an adaptation of the name of the business entity.

3. The method of claim 1, wherein at least one of the plurality of social media posts is published on an interface of the at least one social networking service, the interface being managed by the business entity.

4. The method of claim 1, wherein obtaining the search results comprises:
   sending at least one query to the at least one social networking service through the API to request social media posts that are provided on the social media networking service and that comprise a reference to the business entity; and
   retrieving, in response to sending the query, the plurality of social media posts.

5. The method of claim 1, further comprising removing, from the search results, duplicate social media posts.

6. The method of claim 1, further comprising, removing, from the search results, social media posts comprising a hyperlink.

7. The method of claim 1, wherein the pronoun list comprises the pronouns "I," "I'm," "I'll," "I've," "me," "my," and "mine."

8. The method of claim 1, wherein analyzing the filtered set of social media posts comprises:
   performing natural language processing on the filtered set of social media posts; and identifying, based on an output of the natural language processing, sentiment expressed in each social media post of the filtered set of social media posts.

9. The method of claim 1, wherein the original content item is a content item that the business entity originally published on the at least one social networking service.

10. The method of claim 1, wherein the original content item comprises content related to a predetermined topic of interest.

11. The method of claim 1, wherein identifying a user who published the at least one social media post comprises identifying a username associated with the at least one social media post.

12. The method of claim 1, wherein determining that the identified user corresponds to a target audience comprises: determining that a size of the user's social network exceeds a specified threshold.

13. The method of claim 1, wherein determining that the identified user corresponds to a target audience comprises:
generating an influence score for the identified user based on at least one of (i) types of engagement activities that other users have performed responsive to social media posts previously published by the identified user, or (ii) an indicator of how many times the other users have performed engagement activities responsive to social media posts previously published by the identified user on the at least one social networking service; and
determining that the identified user corresponds to a target audience based on the generated influence score.

14. A non-transitory computer-readable medium coupled to at least one computer having instructions stored thereon which, when executed by the at least one computer, cause the at least one computer to perform operations comprising:
obtaining search results comprising a plurality of social media posts provided on at least one social networking service, wherein each social media post of the plurality of social media posts comprises a reference to a business entity;
applying a pronoun filter to the plurality of social media posts to obtain a filtered set of social media posts, each social media post in the filtered set comprising at least one pronoun from a pronoun list; identifying, among the filtered set of social media posts, at least one social media post that has shared an original content item;
identifying a user who published the at least one social media post on the at least one social networking service;
determining that the identified user corresponds to a target audience;
identifying an application programming interface (API) offered by the at least one social media networking service;
sending, to the at least one social networking service, a query that conforms with the API to obtain at least one of (i) times associated with social media posts previously published by the identified user, or (ii) times when the identified user has engaged with social media posts published by other users, wherein the query comprises a username of the identified user;
analyzing the obtained times to determine a time frame during which the identified user routinely accesses the at least one social networking service; and
targeting a second content item to the identified user during the determined time frame.

15. The computer-readable medium of claim 14, wherein the reference to the business entity comprises at least one of a name of the business entity, a username associated with the business entity, a nickname associated with the business entity, or an adaptation of the name of the business entity.

16. The computer-readable medium of claim 14, wherein at least one of the social media posts is published on an interface of the social networking service, the interface being managed by the business entity.

17. The computer-readable medium of claim 14, wherein obtaining the search results comprises:
sending at least one query to the at least one social networking service through the API to request social media posts that are provided on the at least one social media networking service and that comprise a reference to the business entity; and
retrieving, in response to sending the query, the plurality of social media posts.

18. The computer-readable medium of claim 14, further comprising removing, from the search results, duplicate social media posts.

19. The computer-readable medium of claim 14, further comprising, removing, from the search results, social media posts comprising a hyperlink.

20. The computer-readable medium of claim 14, wherein the pronoun list comprises the pronouns "I," "I'm," "I'll," "I've," "me," "my," and "mine."

21. The computer-readable medium of claim 14, wherein analyzing the filtered set of social media posts comprises:
performing natural language processing on the filtered set of social media posts; and
identifying, based on an output of the natural language processing, sentiment expressed in each social media post of the filtered set of social media posts.

22. A system comprising:
at least one computer; and
a computer-readable medium coupled to the at least one computer having instructions stored thereon which, when executed by the at least one computer, cause the at least one computer to perform operations comprising;
obtaining search results comprising a plurality of social media posts provided on at least one social networking service, wherein each social media post of the plurality of social media posts comprises a reference to a business entity;
applying a pronoun filter to the plurality of social media posts to obtain a filtered set of social media posts, each social media post in the filtered set comprising at least one pronoun from a pronoun list; identifying, among the filtered set of social media posts, at least one social media post that has shared an original content item;
identifying a user who published the at least one social media post on the at least one social networking service;
determining that the identified user corresponds to a target audience;
identifying an application programming interface (API) offered by the at least one social media networking service;
sending, to the at least one social networking service, a query that conforms with the API to obtain at least one of (i) times associated with social media posts previously published by the identified user, or (ii) times when the identified user has engaged with social media posts published by other users, wherein the query comprises a username of the identified user;

analyzing the obtained times to determine a time frame during which the identified user routinely accesses the at least one social networking service; and targeting a second content item to the identified user during the determined time frame.

23. The system of claim 22, wherein the reference to the business entity comprises at least one of a name of the business entity, a username associated with the business entity, a nickname associated with the business entity, or an adaptation of the name of the business entity.

24. The system of claim 22, wherein at least one of the plurality of social media posts is published on an interface of the social networking service, the interface being managed by the business entity.

25. The system of claim 22, wherein obtaining the search results comprises:

sending at least one query to the at least one social networking service through the API to request social media posts that are provided on the social media networking service and that comprise a reference to the business entity; and retrieving, in response to sending the query, the plurality of social media posts.

26. The system of claim 22, further comprising removing, from the search results, duplicate social media posts.

27. The system of claim 22, further comprising, removing, from the search results, social media posts comprising a hyperlink.

28. The system of claim 22, wherein the pronoun list comprises the pronouns "I," "I'm," "I'll," "I've," "me," "my," and "mine."

29. The system of claim 22, wherein analyzing the filtered set of social media posts comprises:

performing natural language processing on the filtered set of social media posts; and identifying, based on an output of the natural language processing, sentiment expressed in each social media post of the filtered set of social media posts.

* * * * *